US 10,133,988 B2

(12) United States Patent
Ribeiro Mendes Júnior et al.

(10) Patent No.: US 10,133,988 B2
(45) Date of Patent: Nov. 20, 2018

(54) METHOD FOR MULTICLASS CLASSIFICATION IN OPEN-SET SCENARIOS AND USES THEREOF

(71) Applicants: SAMSUNG ELECTRÔNICA DA AMAZÔNIA LTDA., Campinas (BR); UNIVERSIDADE ESTADUAL DE CAMPINAS—UNICAMP, Campinas (BR)

(72) Inventors: Pedro Ribeiro Mendes Júnior, Campinas (BR); Roberto Medeiros De Souza, Campinas (BR); Rafael De Oliveira Werneck, Campinas (BR); Bernardo Vecchia Stein, Campinas (BR); Daniel Vatanabe Pazinato, Campinas (BR); Waldir Rodrigues De Almeida, Campinas (BR); Otávio Augusto Bizetto Penatti, Campinas (BR); Ricardo Da Silva Torres, Campinas (BR); Anderson Rocha, Campinas (BR)

(73) Assignees: SAMSUNG ELETRÔNICA DA AMAZÔNIA LTDA., São Paulo (BR); UNIVERSIDADE ESTADUAL DE CAMPINAS—UNICAMP, São Paulo (BR)

( * ) Notice: Subject to any disclaimer, the term of this patent is extended or adjusted under 35 U.S.C. 154(b) by 470 days.

(21) Appl. No.: 14/532,580

(22) Filed: Nov. 4, 2014

(65) Prior Publication Data

US 2016/0092790 A1   Mar. 31, 2016

(30) Foreign Application Priority Data

Sep. 25, 2014  (BR) .......................... 1020140237801

(51) Int. Cl.
*G06N 99/00*   (2010.01)

(52) U.S. Cl.
CPC .................................. *G06N 99/005* (2013.01)

(58) Field of Classification Search
CPC ........................... G06N 99/005; G06K 9/6257
USPC ........................................................... 706/12
See application file for complete search history.

(56) References Cited

U.S. PATENT DOCUMENTS

| | | | | |
|---|---|---|---|---|
| 2003/0063780 A1* | 4/2003 | Gutta | ................. | G06K 9/00288 |
| | | | | 382/118 |
| 2006/0093208 A1* | 5/2006 | Li | ...................... | G06K 9/00288 |
| | | | | 382/159 |

(Continued)

OTHER PUBLICATIONS

Takashi K et al., "Method and Device for Recognizing Signal and Learning Method and Device of Signal Recognizing Device", JPH08263660, Also published as: JP2993862, Oct. 11, 1996.*

(Continued)

*Primary Examiner* — Dave Misir (74) *Attorney, Agent, or Firm* — Staas & Halsey LLP (57) ABSTRACT

The proposed method is used for classification in open-set scenarios, wherein often it is not possible to first obtain the training data for all possible classes that may arise during the testing stage. During the test phase, test samples belonging to one of the classes used in the training phase are classified based on a ratio between similarity scores, as known correct class and test samples belonging to any other class are to be rejected and classified as unknown.

12 Claims, 6 Drawing Sheets

(56) References Cited

U.S. PATENT DOCUMENTS

| | | | |
|---|---|---|---|
| 2008/0215311 A1* | 9/2008 | Chelba | G06F 17/2715 704/9 |
| 2010/0241598 A1* | 9/2010 | Yuta | G06F 19/707 706/12 |
| 2011/0235900 A1* | 9/2011 | Porikli | G06K 9/622 382/159 |
| 2011/0257976 A1* | 10/2011 | Huo | G10L 15/02 704/256.1 |
| 2012/0089330 A1* | 4/2012 | Hesch | G01C 21/16 701/433 |
| 2013/0144937 A1* | 6/2013 | Lee | G06Q 50/01 709/203 |

OTHER PUBLICATIONS

Lee G. et al., "Construction Method of Classification Model for Emotion Recognition and Apparatus Thereof", KR20130006030, Jan. 16, 2013.*

Schmidtler M. et al., "Method and System for Transductive Data Classification and Data Classification Methods Using Machine Learning Techniques", WO 2008/008142 A2, Jan. 17, 2008.*

Scheirer W et al., "Toward Open Set Recognition", IEEE Transactions on Pattern Analysis and Machine Intelligence, vol. 35, No. 7, Jul. 2013.*

Costa F. et al., "Open Set Source Camera Attribution", 2012, 25th SIBGRAPI Conference on Graphics, Patterns and Images.*

Zhou X. et al., "Relevance feedback in image retrieval: A comprehensive review", Multimedia Systems 8: pp. 536-544, 2003.*

Scholkopf B. et al., "Estimating the Support of a High-Dimensional Distribution", Microsoft Technical Report MSR-TR-99-87, Nov. 27, 1999.*

Phillips P. et al., "Evaluation Methods in Face Recognition", S.Z. Li, A.K. Jain (eds.), Handbook of Face Recognition,DOI 10.1007/ 978-0-85729-932-1_21, © Springer-Verlag London Limited 2011.*

Junior P. et al., "Nearest neighbors distance ratio open-set classifier", Springer, Mach Learn, 2017 (date precludes usage).*

* cited by examiner

METHOD FOR MULTICLASS CLASSIFICATION IN OPEN-SET SCENARIOS AND USES THEREOF

CROSS-REFERENCE TO RELATED APPLICATIONS

This application claims the priority benefit of Brazilian Patent Application No. 10 2014 023780 1, filed Sep. 25, 2014, in the Brazilian Intellectual Property Office, the disclosure of which is incorporated herein by reference.

BACKGROUND

1. Field

The proposed method is used for classification in open-set scenario, whereby it is often not possible to obtain training data beforehand for all possible classes that can occur in the test phase (which corresponds to the proposed method). During test phase, the test samples belonging to one of the classes used in training phase must be classified as the correct known class and the test samples belonging to any other classes must be rejected and classified as unknown.

In comparison to the existing solutions, the present invention adds value to solutions/products by providing outperformance on classification and recognition systems, such as: fingerprint recognition, face recognition, speech recognition, object recognition, scene recognition, character recognition, actions recognition, remote sensing image classification, and others general pattern recognition applications. Medical applications can also take advantage of the present invention, considering that most of these real medical cases must deal with unknown classes (e.g.: a new type of cancer, a view of the heart ultrasound image in which the doctors are not interested in, unknown types of diseases, etc.).

2. Description of the Related Art

A method known in the prior art is the Optimum-Path Forest (OPF) classifier, which is a graph-based classifier that was developed as a generalization of other method, the Image Forest Transform (IFT), and is inherently multiclass, and independent of parameterization. OPF is similar to the well-known k-Nearest Neighbors (kNN) method. The OPF makes no assumption about the shapes of the classes and can support some degree of intersection/overlapping between the classes. OPF has shown good results in many classification problems. Notice that OPF is inherently closed set, i.e., a test sample is always classified as one of the trained classes.

Another known method in the prior art is the traditional binary Support Vector Machine (SVM) classifier, which can assign a test sample to a certain class even if the test sample is very different from the training samples of the class. SVM defines half-spaces and does not verify how far the test sample is from the training samples. This strong generalization may not be useful in the open-set scenario; probably the test sample faraway from hyper plain must be classified as unknown, instead of one of the known classes. Therefore, the SVM can be considered as a binary closed-set classifier. However, the One-vs-All approach applied on the SVM generates a multiclass (MCSVM) classifier, which can be considered proper to the open-set scenario.

Patent document JP 2993826 B2, titled: "Method and Device for Recognizing Signal and Learning Method and Device of Signal Recognizing Device", published on Dec. 27, 1999, describes a recognition method that handles open-set scenario in the trivial way: by simply defining a threshold in the classification output. For example, the study/work of Phillips et al (P. J. Phillips, P. Grother, R. Micheals, "Evaluation methods in face recognition", in: S. Z. Li, A. K. Jain (Eds.), Handbook of Face Recognition, Springer, 2011, pp. 551-574) also used the approach of defining a threshold on the "similarity score" to classify as unknown. However, this approach has drawbacks like performance degradation, considering the difficulty to establish/compute similarity scores on high dimensional space. The proposed method of the present invention defines a threshold on the "ratio of similarity scores", which is different and advantageous in comparison to a "threshold on the similarity score" (proposed by JP 2993826 B2, and which is the most used approach to handle open-set classification problems), as will be demonstrated along the specifications of the present invention. Another difference is that the proposed solution in the document JP 2993826 B2 allows updating the "rejection threshold" and other parameters, while the method of the present invention obtain the threshold on the ratio on similarity score and this threshold is not updated anymore during the testing phase.

Patent document US 2013/0144937 A1, titled: "Apparatus and Method for Sharing User's Emotion", published on Jun. 6, 2013, describes a closed-set classification method. Differently from the method proposed in the present invention, the document US 2013/0144937 A1 does not propose an open-set recognition method and does not use ratio on similarity scores of classification. An eventual similarity with the method proposed in the present invention is the fact that the method of US 2013/0144937 A1 document uses an "emotion rate", based on two "emotional states" (see claim 1 of US 2013/0144937 A1). But the "emotional state" disclosed on US 2013/0144937 A1 document is not the same of "similarity score" of the method proposed in the present invention. According to FIG. 2, claim 1 and paragraphs [0056]-[0058] of US 2013/0144937 A1 specifications, it becomes clear that the "emotion rate" is used to give an answer (classification) to the user with a degree (rate) within a range of possible emotional states, i.e., the "emotion rate" is not used for recognizing purposes. The document US 2013/0144937 A1 does not mention or suggest a "ratio" or comparison of different classification scores for the purpose of automatically learning the relationship of known classes to eliminate the ones that are unknown at testing phase, as proposed by the method of the present invention.

The next 4 patent documents U.S. Pat. No. 7,308,133, U.S. Pat. No. 8,306,818, U.S. Pat. No. 8,515,758 and KR 2013-0006030 do not propose open-set recognition methods; rather they aim at proposing solutions to closed-set classification/recognition scenarios.

Patent document U.S. Pat. No. 7,308,133 B2, titled: "System and Method of Face Recognition Using Proportions of Learned Model", published on Dec. 11, 2007, proposes a system and method for performing face recognition using proportions of the learned model. It refers to a classifier to classify multiple profiles of individuals additionally to the frontal face. Based on the image used in the testing phase, the matter disclosed on document U.S. Pat. No. 7,308,133 B2 generates different versions (proportions) of that image to match against the training ones. A voting scheme, whereby each proportion of the image generates a vote, is used to decide the class of the testing image. But it is not mentioned how are treated the cases in which the testing image belongs to none of the training classes (i.e., it is a closed-set scenario). The term "unknown" used in patent document U.S. Pat. No. 7,308,133 refers to the sample that appear during testing phase in which its class is not known before the classification is performed, but the document U.S.

Pat. No. 7,308,133 B2 assumes the test sample belongs to at least one of the training classes and it will be classified as such. Differently, in the context of the present invention, the term "unknown" is used to refer to the test samples that belong to none of the training classes. Furthermore, in contrast with the present invention, the document U.S. Pat. No. 7,308,133 B2 does not propose an open-set recognition method and it does not use ratio on similarity scores for classification.

Patent document U.S. Pat. No. 8,306,818 B2, titled: "Discriminative Training of Language Models Text and Speech Classification", published on Nov. 6, 2012, describes a statistical classifier for the specific problem of speech and text classification. This classifier does not perform open-set recognition, as can be seen in FIG. 4 of document U.S. Pat. No. 8,306,818 B2. In fact, the test sample is assigned to the "class with the highest resulting value" (column 8, line 46), i.e., it is a closed-set classifier. It is also explained that the classifier can classify the test sample into one or more classes, depending on the probability (column 1, line 44). The term "unknown" mentioned in patent document U.S. Pat. No. 8,306,818 B2 refers to the classes of words not considered by the system, i.e., explicitly eliminated from it. Differently, in the context of the present invention, the term "unknown" refers to the test samples that belong to none of the training classes. Furthermore, in contrast with the present invention, the document U.S. Pat. No. 8,306,818 B2 does not propose an open-set recognition method and it does not use ratio on similarity scores for classification.

Patent document U.S. Pat. No. 8,515,758 B2, titled: "Speech Recognition Including Removal of Irrelevant Information", published on Aug. 20, 2013, presents a speech recognition system based on a statistical classifier responsible for classifying an input utterance, and the classification method is not based on similarity scores (neither on "ratio on similarity scores", as proposed in the method of the present invention). The term "unknown" mentioned in document U.S. Pat. No. 8,515,758 B2 refers to the test sample whereby its correct class is not known a priori, i.e., when it is not known which of the training classes the test sample belongs to. Differently, in the present invention, the "unknown" term refers to the test sample that belongs to none of the training classes.

Patent document KR 2013/0006030 A, titled: "Construction Method of Classification Model for Emotion Recognition and Apparatus Thereof", published on Jan. 16, 2013, presents a method and apparatus to classify a plurality of emotions (emotion recognition) from biometric data by using a binary system. In contrast with the present invention, patent document KR 2013/0006030 A does not present an open-set recognition method, i.e., a method to classify a test sample as belonging to none of the trained classes. The document KR 2013/0006030 A does not present any kind of "ratio of similarity scores" to use in classification.

Patent document US 2006/0933208 A1, titled: "Open-Set Recognition Using Transduction", published on May 4, 2006, proposes the TCM-kNN (Transductive Confidence Machine-k Nearest Neighbors), a method for biometric open-set recognition. A system specifically designed in terms of a face recognition application, and mentioned the method can be applied to other recognition problems, but do not go into details how it would be done. In order to allow unknown classification, it is automatically defined a rejection threshold on what the inventors called "peak-to-side ratio". The peak-to-side ratio is a value that can be obtained based on p-values for each training class. The threshold is obtained based on several peak-to-side ratios (one for each training class). The method of document US 2006/0933208 A1 can be used in applications whereby each training class can be represented as a template sample (or sample identifier). In contrast, the proposed method in the present invention can be applied to general open-set recognition problems, not only those in which all training samples of a certain class can be condensed on a template sample.

A contribution of the WO 20060933208 A1 solution is on automatically defining a threshold on the training template samples to allow unknown classification. In contrast, the method of the present invention does not define the threshold on the distance function, but rather the threshold is defined on the ratio of the distances (similarity scores) of two different classes. Furthermore, it is not clear on document US 2006/0933208 A1 whether the peak-to-side ratio continues to make sense or work perfectly at all when the classifier is trained with several samples for each class.

The patent document WO 2008008142 A2, titled: "Machine Learning Techniques and Transductive Data Classification", published on January 17, describes a binary classifier that uses transductive learning, which is a type of semi-supervised learning. The proposed method does not deal with transduction classification neither with semi-supervised classification, i.e., does not use the "unlabeled data points as training examples" nor propagate labels of known examples to unknown ones. Finally, the method proposed in document WO 2008008142 A2 requires at least one labeled example per class, which transform the problem in a closed-set classification problem. This is not the scope and purpose of the proposed method in the present invention.

The report titled: "Estimating The Support of a High-Dimensional Distribution" (B. Schölkopf; J. Platt; J. Shawe-Taylor; A. Smola; R. Williamsom; Technical Report MSR-TR-99-87; Microsoft Research; 1999), Schölkopf et al. (1999) proposes an extension of the SVM called the one-class SVM (OCSVM). This classifier is trained on just one known class, and finds the best margin with respect to the origin. This is the most reliable approach in cases where the access to a second class is very difficult or even impossible. Despite this approach is very suitable for the open-set scenario, it refers to a one-class classifier (binary-based) and therefore it does not take advantages of all available classes for training (since it only uses just one known class for training, even if there are other available classes).

In fact, the paper "Relevance Feedback in Image Retrieval: a Comprehensive Review" (X. Zhou and T. Huang; Multimedia Systems 8; pp. 536-544; Springer-Verlag; 2003) mentions that the OCSVM has a limited use because it does not provide good generalization or specialization ability. Differently from the method disclosed by Schôlkopf et al. (1999), the method proposed in the present invention is a multiclass classifier, and it is not SVM-based.

The Paper "Open-Set Source Camera Attribution" (F. Costa, M. Eckmann, W. Scheirer and A. Rocha; XXV SIBGRAPI—Conf. on Graphics, Patterns and Images, 2012, pp. 71-78), Costa et al. (2012) presents a camera source attribution algorithm considering the open-set scenario. As the original binary SVM risk minimization is based only on the known classes, it can misclassify the negative and unknown classes that can appear in the test phase. So, Costa et al. (2012) proposed the method called in the state of the art as SVM with Decision Boundary Carving (SVMDBC) which minimizes the risk of the unknown instead of finding the maximum margin separation hyper plane. The minimization of the risk of the unknown is done by moving the decision hyper plane found by the traditional SVM by a value c inwards or outwards the positive class. The value c is defined by an exhaustive search to minimize the training data error. The method SVMDBC disclosed by Costa et al. (2012) is SVM-based, binary and open-set, in contrast with the method of the present invention which is not SVM-based, multiclass and open-set scenario. Effectively, the method presented by Costa et al. (2012) refers to a method for controlling false positives.

The Paper titled: "Towards Open-Set Recognition" (W. Scheirer, A. Rocha, A. Sapkota, T. Boult; IEEE Transactions on Pattern Analysis and Machine Intelligence—TPAMI, July 2013, vol. 35, no. 7, pp. 1757-1772): Scheirer et al. (2013) introduced the 1-vs-Set Machine with a linear kernel formulation that can be applied to both the binary and one-class SVMs. Also, the objective is to minimize the risk of the unknown, what is done by minimizing the positive labeled region (i.e., the open space risk) combined with margin constraints to minimize empirical risk (measured on training data). Scheirer et al. (2013), similarly to the disclosed matter of Costa et al. (2012), also moves the original SVM hyper plane inwards the positive class, but now adding a far hyper plane "after" the positive samples aiming to decrease the open space risk. The hyper planes are initialized to contain all the positive samples. Then, a refinement step is performed to adjust the hyper plane in order to generalize or train the classifier according to the user parameters. As noted by Scheirer et al. (2013), better results are usually obtained when the SVM original hyper plane is neat to the positive boundary aiming a specialization, and the added hyper plane is adjusted aiming generalization. Despite the generalization of the second hyper plane, this is a form of specialization when compared to the original SVM where it can be considered the second hyper plane is at infinity. According to the authors of the article, the negative samples after the second hyper plane (added) are not close to the positive samples, and that is the reason of the generalization of this hyper plane. The method proposed in the present invention goes further since it can handle multiclass open-set classification problems and define a bounded open space of risk.

Open space of risk refers to the region in the feature space of the samples, such that any sample inside this region is always classified as one of the known classes instead of unknown. In the state of the art, the proposed solutions to handle with open-set recognition problem are mainly SVM-based solutions. In these solutions, the objective is to minimize the risk of the unknown by minimizing the open space of risk. As SVM methods define half-spaces (i.e., a single borderline), it is not trivial to create a bounded open space. Every SVM extension or improvement for open-set scenario found in the state of the art maintains an unbounded open space of unlimited risk. The challenge of potential solutions is to minimize the open space of risk, preferably creating a finite open space of risk, what the present invention does.

According to the known state of the art and the analyzed solutions, there are four types of methods to classification/recognition problem:
  (1) Multiclass and closed-set: OPF, kNN;
  (2) Binary and closed-set: SVM;
  (3) Binary and open-set: SVM, OCSVM (Scholkopf et al. 1999), SVMDBC (Costa et al. 2012), 1-vs-Set Machine (Scheirer et al., 2013);
  (4) Multiclass and open-set: the method of the present invention; MCSVM (adapted SVM); adjusted kNN using a threshold on the similarity score (adapted KNN); MCSVM-DBC (SVMDBC adapted using One-vs-All approach); and One-vs-All Machine (when adapted to open-set scenario using One-vs-All approach).

No paper or patent document discloses a multiclass method inherently for open-set scenario, despite prior art can be adapted to be multiclass and open-set (however, without good results). As will be described in details hereinafter, the method proposed in the present invention has novel, distinct features and aspects in comparison to prior art solutions.

SUMMARY

Additional aspects and/or advantages will be set forth in part in the description which follows and, in part, will be apparent from the description, or may be learned by practice of the invention.

The present invention refers to a recognition method that allows to reject samples (i.e., classify as unknown) in general multiclass open-set recognition problems. There are solutions in the prior art that allow multiclass classification, but do not allow unknown classification unless a non-trivial threshold is defined on the similarity score of the classifier. Also, there are open-set solutions in the prior art for the binary scenarios that do not support multiclass classification on their core algorithm. In fact, the binary scenario is not a real open-set scenario and the binary solutions proposed for open-set scenario refer to the controlling of false positives.

The solution proposed in the present invention generates a bounded open space of risk, while the current proposed binary open-set solutions leave an unbounded open space of risk. In other words, the samples belonging to classes not seen during training phase can be properly identified and dealt with (not classified as a class of interest) by the method of present invention during testing/execution phase. Without modifications, current multiclass solutions would misclassify the referred samples as a known class. Differently from the current multiclass solutions, the present method does not need a complex parameterization according to each set of training and test data (dataset), i.e., it can be directly used in multiclass open-set problems regardless if just a few classes or all of them are known during training phase.

This invention is a classification method which receives the feature vector (input data to be classified) and returns the classification results (the class of the input data or unknown). To use the present invention in real applications or products, it would be necessary just a device running the proposed classification method. Any data descriptor can also be included in the aforementioned device to generate the feature vector from the input data to be processed by the invention of the invention. In some cases, the data collection and the use of the classification results can also be handled by the same device. Many actions can be performed based on the results of the present classification method. Then, the present invention clearly has broad scope and is general enough to be applied to a large range of classification problems in so many applications.

In real applications, most of the testing samples are considered as unknown, because it is impossible to know the real world in its entirety and all of its possible classes. Experiments results, presented hereinafter on this document, indicate that the proposed method outperforms existing methods in open-set scenario. Using the proposed method, most of the unknown testing samples are correctly classified as unknown and most of the known testing samples are properly classified as the corresponding correct class.

Instead of using a threshold of the matching score obtained based on the input data and the most similar class (the usual approach to handle the open-set scenario), the method of the present invention obtains the two more similar classes and establish a threshold on the ratio of two matching scores, which allows the method to adapt itself better than prior art when too many features are extracted from the input data (high-dimensional feature space).

A system or device implementing an embodiment of this invention will provide competitive advantage in the corresponding market. Any application which requires the denial/refusal of some types of input data can use the method of the present invention. General recognition applications, which are inherently open-set (for instance: biometric recognition, object recognition, scene recognition, speech recognition, character recognition, pattern recognition, etc.) could profit from the present invention. Medical applications, where only a finite number of diseases are known during training phase and many others (unknown) appear during the method usage (test phase), would also benefit from the method proposed herein.

BRIEF DESCRIPTION OF THE DRAWINGS

The objectives and advantages of the present invention will become more clear by means of the following detailed description of a preferred but non-limitative embodiment of the invention, in view of its appended figures, wherein.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

Classification refers to the problem of assigning a test sample to one or more classes of a set of known ones. On the other hand, recognition is the task of verifying whether a test sample belongs to one of the known classes and, if so, finding out to which of known class the test sample belongs to.

Figure 1A:
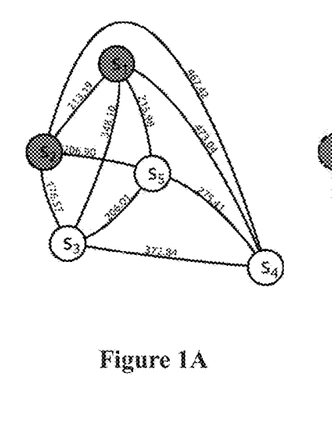
FIG. 1A represents training phase with the complete graph of five samples, according to an OPF classifier known in the prior art.
Figure 1B:
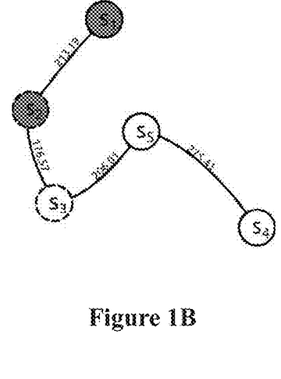
FIG. 1B shows the Minimum Spanning Tree (MST) M calculation, wherein the dashed samples S2 and S3 are chosen as prototypes according to the OPF classifier of FIG. 1A.
Figure 1C:
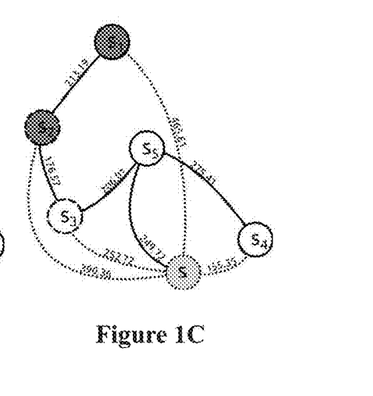
FIG. 1C shows a test phase, according to the OPF classifier in FIG. 1A.

A method known in the prior art is the Optimum-Path Forest (OPF) classifier, whose operation is briefly illustrated in FIGS. 1A-1C, where FIGS. 1A-1B represent training/fitting phase and FIG. 1C represents test/prediction phase. The example shows five training samples: $S_3$, $S_4$, and $S_5$ from the white class and $S_1$ and $S_2$ from the dark-gray class.

FIG. 1A shows complete graph calculation based on training samples, wherein the numeric values on the arcs indicate the distance between samples in the feature space.

FIG. 1B shows Minimum Spanning Tree (MST) M calculation, wherein dashed samples $S_2$ and $S_3$ are chosen as prototypes.

FIG. 10 shows the classification of the light-gray dotted test sample S, which is assigned to the tree rooted in prototype $S_3$ because it offers the shortest distance (lowest cost) and, therefore, test sample s is classified as belonging to the white class.

However, it should be noted that it is possible to have a test sample that does not belong to any of the known classes (i.e., it is not a closed set scenario). For instance, recognizing if a biometric sample belongs to one of the individuals registered in a biometric recognition system (i.e., the sample belongs to a known class and the biometric recognition system should accept it) or if it does not (i.e., the sample does not belong to a known class and the recognition system should reject it).

In this case, the recognition scenario is more similar to an open-set scenario. In the open-set scenario, the classifier cannot be trained with all possible classes (unlike the closed-set scenario, whereby all classes are known a priori—and can be applied to specific problems). Open-set scenario is multiclass when the classifier must classify a test sample as one of the known training classes or as unknown. In this case, it is possible to have the following types of error: (1) the test sample belongs to one of the known training classes, but the classifier classified it with a wrong known class; (2) the test sample belongs to one of the known training classes, but the classifier classified it as unknown class; and (3) the test sample belongs to an unknown class, but the classifier classified it as one of the known training classes. In a closed-set classification scenario, only the error (1) makes sense (i.e., closed-set scenario is not suited to correctly deal with test samples that belongs to unknown training classes).

A common approach to partially handle the open-set scenario is to define a threshold T and verify whether the matching score is greater than or equal to T. This approach consists in classifying a test sample as unknown when the more similar training class is not sufficiently similar. Without that threshold, an unknown test sample will always be assigned to one of the training classes, which is not true in an open-set scenario.

Figure 2:
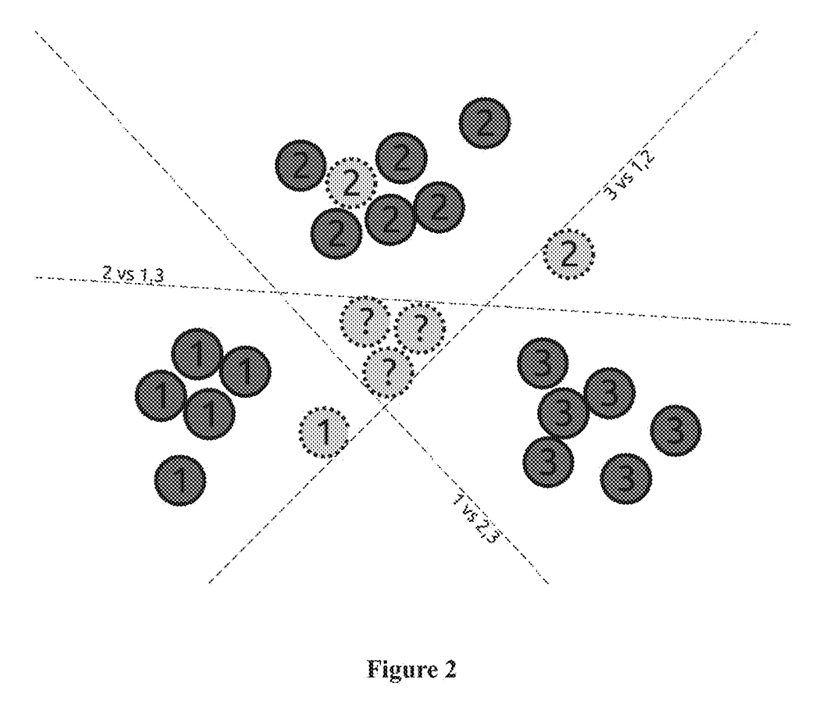
FIG. 2 illustrates an example of classification performed by the Multiclass Support Vector Machine (MCSVM) method using a one-versus-all approach, known in the art.

FIG. 2 illustrates a multiclass SVM method using a One-vs-All approach (MCSVM), known in the prior art, that can classify a test sample as unknown (represented by "?" in the FIG. 2) because they are classified as negative by all binary classifiers composing the MCSVM (in this case: 1 vs 2,3; 2 vs 1,3; 3 vs 1,2). Anyway, faraway test samples are also going to be classified as one of the known classes in most cases by the multiclass version of the SVM because this classifier creates an unbounded open space of risk.

Figure 3:
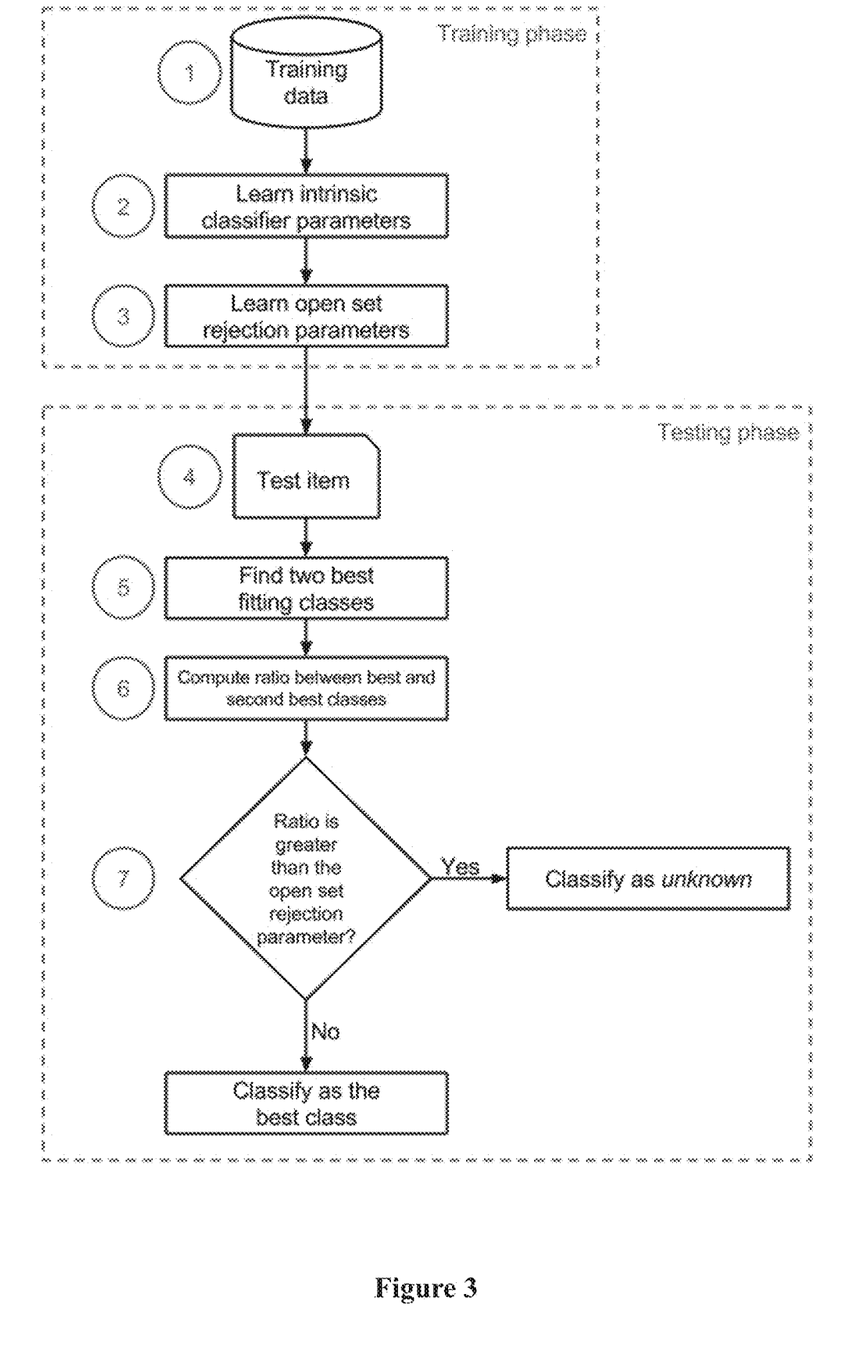
FIG. 3 shows a flowchart with main steps/stages of the proposed method in the present invention.

FIG. 3 is a general overview of the present invention, represented by a flowchart with the main steps of the method proposed in the present invention. The flowchart is divided in two parts: training phase (steps 1, 2 and 3) and testing phase (steps 4, 5, 6 and 7).

On training phase, a set of samples used for training is divided into n classes of interest (step 1), that will be used for training the multiclass classifier (step 2), i.e., obtain the intrinsic classifier parameters. There are many ways for training a multiclass classifier, for example (but not limited to) Optimum Path Forest (OPF) and k-Nearest Neighbors (kNN), among other techniques known in the prior art. The rejection parameter T ($0.0 \leq T \leq 1.0$) is obtained based on the parameter optimization (step 3) and will be used later (for testing phase, in step 7) to determine if the test samples will be classified as unknown or classified as one of the n trained/known classes.

Figure 4A:
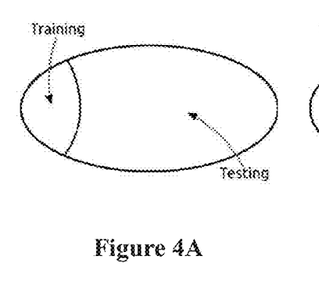
FIG. 4A shows a first representation of the training data partitioning, according to an embodiment of the method of the present invention.
Figure 4B:
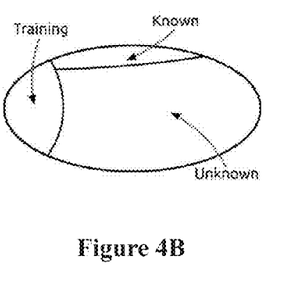
FIG. 4B shows a second representation of the training data partitioning and the expected feature of these data in real scenario.

In the context of the present invention, samples are divided between training and testing sets (see FIG. 4A). In an open-set scenario, the testing set is the union of the known set and the unknown set, as there are classes whereby samples are not available for training (see FIG. 4B). For a better result of the parameter optimization phase (Step 3), the samples of training set (Step 1) are divided into fitting set (samples used to effectively train a classifier) and validation set (samples used to verify the accuracy based on a testing value of T), said division being done as follows: (i) only half of the available classes have representative samples in fitting set; (ii) for each class having representative samples in the fitting set, half of its samples is in fitting set and the other part is in validation set (see FIG. 4C). Note that the parameter optimization (Step 3) is only a way to simulate the open-set scenario and obtain a reasonable threshold T, and therefore, this parameter optimization (Step 3) can be performed in different ways.

Figure 4C:
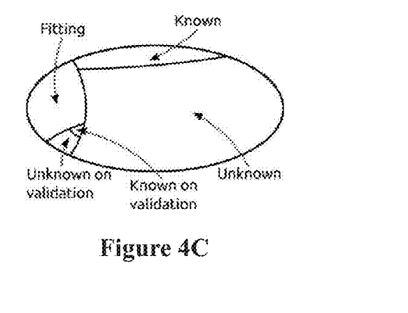
FIG. 4C shows a third representation of the training data partitioning according to an embodiment of the method proposed in the present invention.

According to FIG. 4C, having defined the fitting set and validation set, parameter optimization (Step 3) fits a classifier based on the samples of the fitting set, and a traditional grid search procedure is performed to find the better value for rejection parameter T based on the samples in validation set.

During the testing phase (which corresponds the usage/operation of the method, after fitting the classifier on training phase), a test sample S (a new descriptor) is submitted (step 4) to the proposed method, which obtains the two best fitting classes (step 5), i.e., the two "nearest" classes $c_1, c_2$ to test sample S among the n trained/known classes. Then, the method computes the ratio of the two best similarity scores (step 6), i.e., the ratio $R = \delta_1 / \delta_2$ between the "distance/similarity score" $\delta_1$ from test sample S to the best fitting class $c_1$ and the "distance/similarity score" $\delta_2$ from test sample s to second best fitting class $c_2$ (considering that smaller similarity scores are better). There are many ways to determine "distance/similarity score" $\delta$, for example (but not limited to) the cost function $f_{cost}$ of OPF and distance metrics of kNN, among other techniques known in the prior art. Finally, the method checks (Step 7) if the ratio R of the two best similarity scores (obtained in step 6) is greater than the rejection parameter T (obtained in step 3): if so (R>T), the test sample S (submitted in step 4) is classified as unknown (none of the n trained/known classes); otherwise (R≤T), the test sample S (submitted in step 4) is classified as the best fitting class $c_1$ (one of the n trained/known classes, obtained in step 5).

Figure 5:
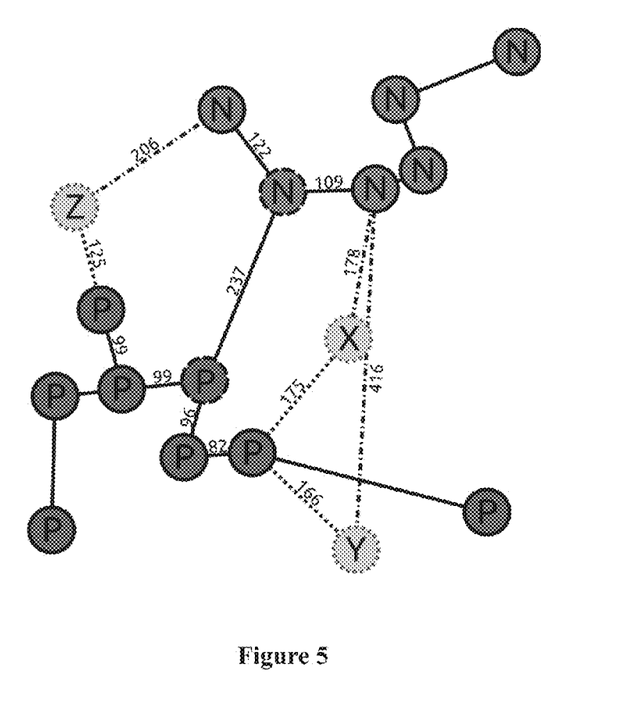
FIG. 5 illustrates the functioning of the proposed method for classifying samples of the present invention.

For a better understanding of the proposed method, an example of its operation (testing phase) is presented in FIG. 5. In the example of FIG. 5, it was used an OPF classifier to find two best fitting classes during the test phase (step 5 of the proposed method). The dark-gray samples N are samples of one class and the dark-gray samples P are samples of another class. The light-gray dotted samples X, Y, and Z are testing samples S. Dashed samples N and P are prototypes of its respective classes. The edge/arc pattern of the test samples s (X, Y, and Z) indicates in which class it is classified after the operation of the proposed method: dotted edges/arcs for class P and dot-dash for class N. The dotted arcs adjacent to a test sample S (X, Y, and Z) are arcs to the neighbor sample of S in the path of the best classification cost/distance $\delta_1$. The dot-dash arcs are adjacent to the neighbor of S in the path of the second best classification cost/distance $\delta_2$. Normal/continuous arcs represent the arcs acquired during the training phase (step 2, in the case of this example, also using an OPF classifier). Supposing that in this case the rejection parameter (threshold) T is 0.80, the test sample X is classified as unknown (negative) because its ratio R=$\delta_1/\delta_2$ is 0.98>T. The test samples Y and Z are classified as P because its ratio R=$\delta_1/\delta_2$ is 0.40 and 0.61, respectively, i.e., both are less than the parameter T (and in this case P is the best fitting class for Y and Z).

Figure 6:
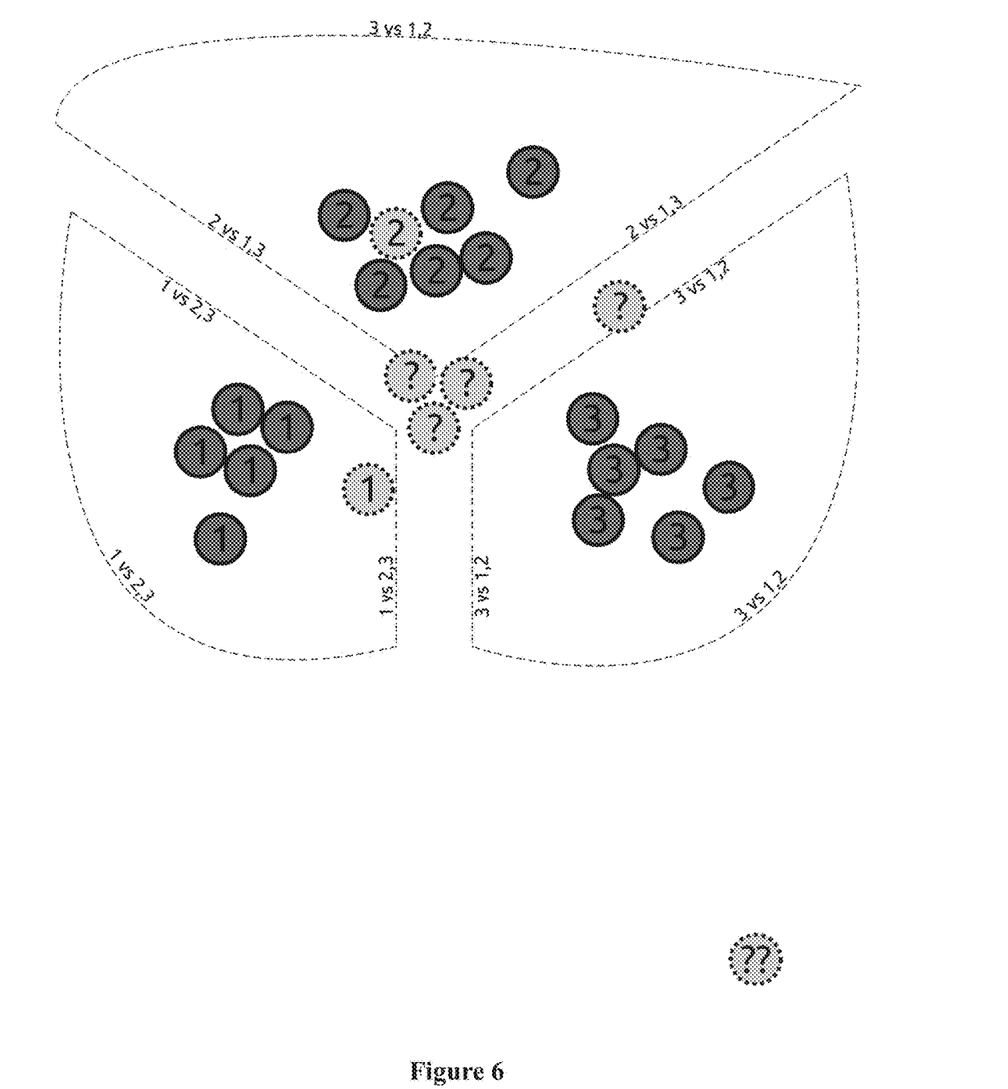
FIG. 6 illustrates an example of the classification performed by the proposed method of the present invention.
Figure 7A:
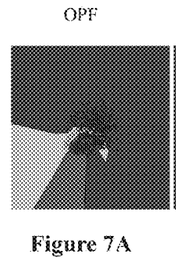
FIG. 7A shows the results of an experiment with Decision Boundaries using the OPF method known in the prior art for the Cone-torus dataset.
Figure 7B:
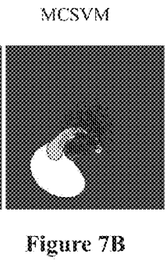
FIG. 7B shows the results of the experiment Decision Boundaries using the MCSVM method known in the prior art for the Cone-torus dataset.
Figure 7C:
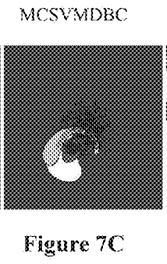
FIG. 7C presents the results of an experiment with Decision Boundaries using the MCSVMDBC method known in the prior art for the Cone-torus dataset.
Figure 7D:
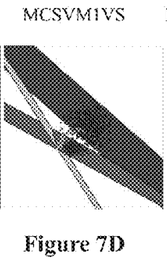
FIG. 7D presents the results of an experiment with Decision Boundaries using the MCSVM1VS method known in the prior art for the Cone-torus dataset.
Figure 7E:
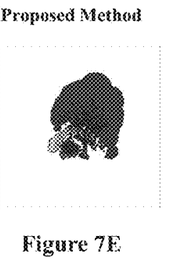
FIG. 7E presents the results of an experiment with Decision Boundaries using the method of the present invention for the Cone-torus dataset.
Figure 8A:
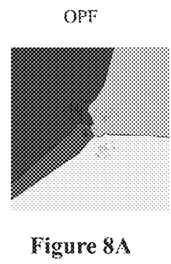
FIG. 8A presents the results of an experiment with Decision Boundaries using the OPF method known in the prior art for the Four-gauss dataset.
Figure 8B:
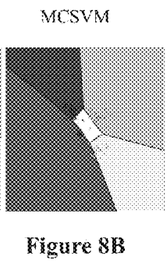
FIG. 8B shows the results of an experiment with Decision Boundaries using the MCSVM method known in the prior art for the Four-gauss dataset.
Figure 8C:
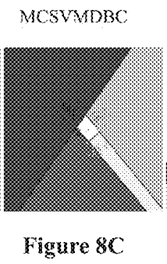
FIG. 8C shows the results of an experiment with Decision Boundaries using the MCSVMDBC method known in the prior art for the Four-gauss dataset.
Figure 8D:
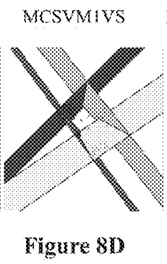
FIG. 8D presents the results of an experiment with Decision Boundaries using the MCSVM1VS method known in the prior art for the Four-gauss dataset.
Figure 8E:
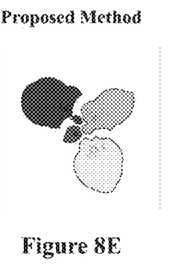
FIG. 8E presents the results of an experiment with Decision Boundaries using the method of the present invention for the Four-gauss dataset.
Figure 9A:
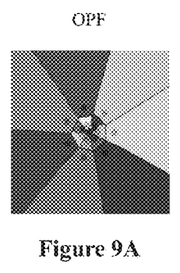
FIG. 9A presents the results of an experiment with Decision Boundaries using the OPF method known in the prior art for the R15 dataset.
Figure 9B:
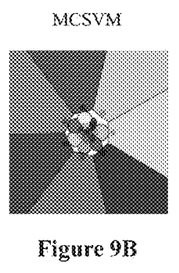
FIG. 9B presents the results of an experiment with Decision Boundaries using the MCSVM method known in the prior art for the R15 dataset.
Figure 9C:
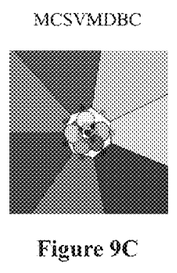
FIG. 9C presents the results of an experiment with Decision Boundaries using the MCSVMDBC method known in the prior art for the R15 dataset.
Figure 9D:
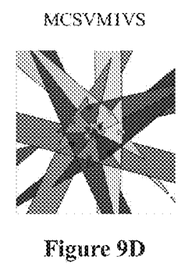
FIG. 9D shows the result of an experiment with Decision Boundaries using the MCSVM1VS method known in the prior art for the R15 dataset.
Figure 9E:
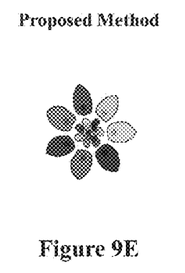
FIG. 9E shows the result of an experiment with Decision Boundaries using the method of the present invention for the R15 dataset.
Figure 10A:
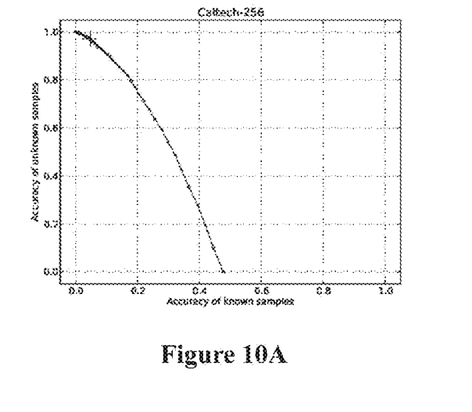
FIG. 10A shows the results of an experiment with the Known-Unknown Curve, counterbalancing the precision/accuracy based on the known samples (x-axis) and precision/accuracy based on unknown samples (y-axis), used to obtain the normalized precision/accuracy for the Caltech-256 dataset.
Figure 10B:
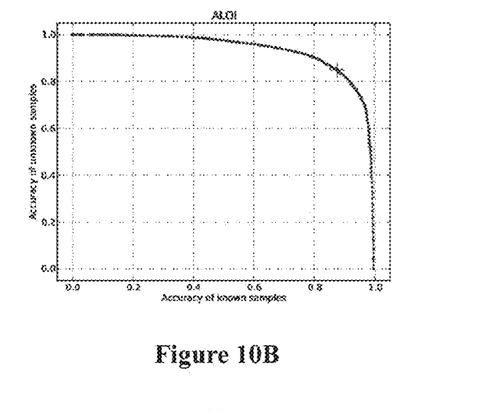
FIG. 10B shows the results of an experiment with the Known-Unknown Curve, counterbalancing the precision/accuracy based on the known samples (x-axis) and precision/accuracy based on unknown samples (y-axis), used to obtain the normalized precision/accuracy for the ALOI dataset.
Figure 10C:
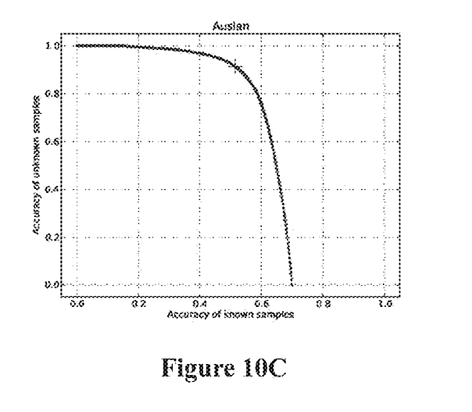
FIG. 10C shows the result of an experiment with the Known-Unknown Curve, counterbalancing the precision/accuracy based on the known samples (x-axis) and precision/accuracy based on unknown samples (y-axis), used to obtain the normalized precision/accuracy for the Auslan dataset.
Figure 10D:
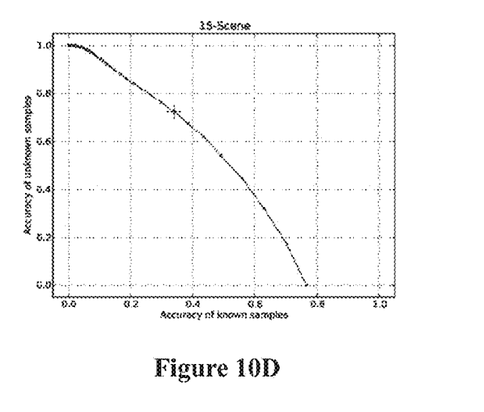
FIG. 10D presents the results of an experiment with the Known-Unknown Curve, counterbalancing the precision/accuracy based on the known samples (x-axis) and precision/accuracy based on unknown samples (y-axis), used to obtain the normalized precision/accuracy for the for 15-Scenes dataset.
Figure 10E:
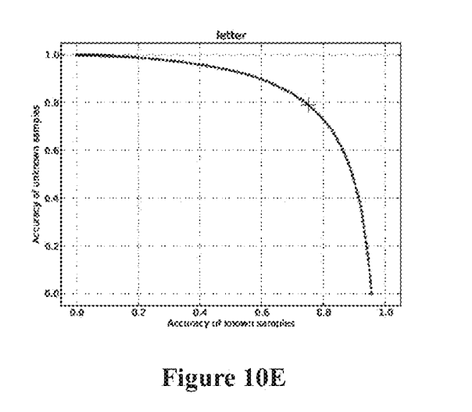
FIG. 10E presents the results of an experiment with the Known-Unknown Curve, counterbalancing the precision/accuracy based on the known samples (x-axis) and precision/accuracy based on unknown samples (y-axis), used to obtain the normalized precision/accuracy for the letter dataset.
Figure 10F:
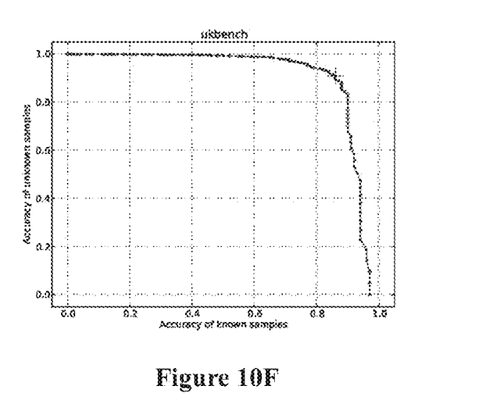
FIG. 10F shows the result of an experiment with the Known-Unknown Curve, counterbalancing the precision/accuracy based on the known samples (x-axis) and precision/accuracy based on unknown samples (y-axis), used to obtain the normalized precision/accuracy for the ukbench dataset.

FIG. 6 shows an example of resulting classification by the proposed method. For comparison purposes, the samples are the same used in the example of FIG. 2 (SVM method using One-vs-All approach). As noted, the classification provided by the present method is not equivalent to those provided by prior art solutions (multiclass SVM). Because the proposed method is based on ratio (R) of the two best similarity scores ($\delta_1,\delta_2$), it defines additional boundaries (represented by dashed curved lines in FIG. 6—inexistent in FIG. 2), creating bounded regions.

In this case, a test sample S "distant" from the training samples may also be classified as unknown, even if every training samples of one class are closer than the nearest sample of other classes. It happens because ratio R tends to 1 as both costs/distances $\delta_1$ e $\delta_2$ increase (and then R also tends to be greater than T, 0.0≤T≤1.0—leading to classify test sample S as unknown). For example, on FIG. 6, the sample "??" is classified as unknown by the proposed method: despite sample "??" is closer to every training samples of class "3" than the nearest sample of other classes ("1" and "2"), sample "??" is also relatively distant (based on ratio R) from training samples of class "3".

Therefore, these bounded regions of the feature space define a finite open space of risk (which is infinite or very large for traditional open-set classifiers). The finite open space of risk increases the capacity of the classifier to correctly classify a test sample as unknown or as best fitting class. In fact, experiments (shown in the end of this description) prove that the proposed method has better accuracy in open-set scenario.

The main innovative characteristic of the proposed method is to extend multiclass classifiers to properly and efficiently handle the open-set scenario, i.e., to search for solutions in which the risk of the unknown is minimized. It is important to minimize such a risk because there is no sample of the unknown classes during training phase.

Another important advantage of the present invention over most open-set classifiers known in the prior art is the fact that the proposed method is inherently multiclass, so its efficiency is not dependent on the number n of training classes that are available for training phase. Multiclass binary-based classifiers, generally used for open-set scenario in the prior art, have an inconvenience: as the number n of available classes increases, the number of necessary binary classifiers also increases and, consequently, the efficiency of the classification process is affected, leading to two other undesirable consequences: (i) it becomes very computationally intensive to use multiclass binary-based classifiers when n is high; and/or (ii) it does not result in good classification.

EXPERIMENTS AND RESULTS

In the context of the experiments using the proposed method of the present invention, the known samples are the samples belonging to one of the available classes for training phase and the unknown samples belong to classes whereby no representative sample was used during training phase.

Experiment 1—Effectiveness of the Method in Open-Set Scenario

In order to observe effectiveness and accuracy of the proposed method in the present invention, it was compared to the following methods known in the prior art: OPF, multiclass SVM with One-vs-All approach (MCSVM), and the multiclass SVMDBC (Costa et al., 2012) with One-vs-All approach (MCSVMDBC) and 1-vs-Set multiclass Machine (Scheirer et al. 2013) with One-vs-All approach, ranging from the less opened scenario to the most opened scenario possible. Six datasets known in the prior art were used in the experiments: Caltech-256, ALOI, Auslan, 15-Scene, letter and ukbench. Those datasets represent applications of object recognition (Caltech-256, ALOI, ukbench), scene recognition (15-Scene), sign language recognition (Auslan), and letter image recognition (letter).

Experiments on all these datasets were performed supposing access to a number of 3, 6, 9, and 12 classes among the total number of classes of each dataset. For each number n of available classes, 10 experiments were made. For each experiment: (1) it was randomly chosen n available classes for training, (2) it was considered half of the known samples in each class for testing, (3) it was considered the samples of the other classes as unknown for testing, and (4) it was acquired results based on open-set measures. The "Analysis of Variance" (ANOVA) statistical test was performed and then used the post-test "Tukey Honest Significant Differences" (HSD) to confirm the superiority of proposed method. As said before, for each combination of classifier, dataset and number n of available classes, it was performed 10 experiments with different sets of available classes.

In Table 1 below, for each pair of methods (intersection between the row and the column), the arrows (↑ and ←) indicate the winner method (↑ for the line method, ← for the column method), and the blanks indicates that difference between the pair of methods is not statistically significant (similar effectiveness) according to the Tukey HSD post-test. The column ac indicates the number of available classes (3, 6, 9, and 12). It can be noted that the proposed method obtains better results than OPF, MCSVM, MCSVMDBC, and MCSVM1VS in all experiments.

TABLE 1

Results of Experiment 1.

| | ac | OPF | MCSVM | MCSVMDBC | MCSVM1VS | Present invention |
|---|---|---|---|---|---|---|
| OPF | 3 | | ↑ | ↑ | ↑ | ↑ |
| | 6 | | ↑ | ↑ | ↑ | ↑ |
| | 9 | | ↑ | ↑ | ↑ | ↑ |
| | 12 | | ↑ | | ↑ | ↑ |
| MCSVM | 3 | ← | | | | ↑ |
| | 6 | ← | | ← | ← | ↑ |
| | 9 | ← | | ← | ← | ↑ |
| | 12 | ← | | ← | ← | ↑ |
| MCSVMDBC | 3 | ← | | | | ↑ |
| | 6 | ← | ↑ | | | ↑ |
| | 9 | ← | ↑ | | | ↑ |
| | 12 | | ↑ | | | ↑ |
| MCSVM1VS | 3 | ← | | | | ↑ |
| | 6 | ← | ↑ | | | ↑ |
| | 9 | ← | ↑ | | | ↑ |
| | 12 | ← | ↑ | | | ↑ |
| Present invention | 3 | ← | ← | ← | ← | |
| | 6 | ← | ← | ← | ← | |
| | 9 | ← | ← | ← | ← | |
| | 12 | ← | ← | ← | ← | |

Experiment 2—Decision Boundaries

Aiming to understand the different behavior of the classifiers, tests were performed on 2-dimensional synthetic datasets for a visualization purpose. It was used the following datasets, already known in the prior art: Cone-torus, Four-gauss, and R15 datasets. The classifiers were trained using all samples of the dataset to plot the decision boundaries for each class. The decision boundary of a class defines the region in which an eventual test sample will be classified as belonging to the class defining the region.

FIGS. 7, 8 and 9 show the results of experiment 2-decision boundaries for the Cone-torus, Four-gauss, and R15 datasets, respectively. FIGS. 7E, 8E and 9E show results of decision boundaries using the proposed method. FIGS. 7A, 8A and 9A represent results of decision boundaries' experiment using the OPF method. FIGS. 7B, 8B and 9B represent results of decision boundaries using the MCSVM method. FIGS. 7C, 8C and 9C represent results of decision boundaries using the MCSVMDBC method. FIGS. 7D, 8D and 9D represent results of decision boundaries using the MCSVM1VS method. The non-white regions represent the region in which a test sample would be classified to the same class of the samples with the same color. All samples in the white regions would be classified as unknown.

Based on the results shown in FIGS. 7A-7E, 8A-8E e 9A-9E, the proposed method is the best fitted classifier to classify testing samples as unknown. The OPF method (FIGS. 7A, 8A, 9A) is closed-set and does not classify any sample as unknown. And while the SVMs methods (FIGS. 7B-7D, 8B-8D, 9B-9D) are able to classify as unknown only the doubtful samples among the available classes, the proposed method (FIGS. 7E, 8E, 9E) avoids recognizing the faraway samples and limits the open space of risk.

Experiment 3—the Known-Unknown Curve

For a better understanding of the impact of the threshold T (rejection parameter) of the proposed method, experiments were performed supposing five available classes for each dataset (Caltech-256, ALOI, Auslan, 15-Scene, letter and ukbench), ranging T from 0.0 (all samples are classified as unknown) to 1.0 (no sample is classified as unknown) stepping by 0.005.

FIGS. 10A-10F present the results of this experiment for each dataset, with is a graph of known-unknown curves that show the counterbalance between the accuracy of known samples (x-axis) and the accuracy of unknown samples (y-axis). The crossed point in the curve indicates the point with the best normalized accuracy.

According to the known-unknown curves of all datasets, it is possible to observe that the proposed method is well-behaved by parameter changing, i.e., a reasonable T (parameter rejection) estimation ensures a feasible open-set classifier for usage in an operational scenario.

General Applications of the Proposed Method and a Detailed Example of its Usage in a Real World Problem As described, the proposed method can be used to solve classification/recognition problems in open-set scenario (which represent the most cases in real world applications/problems). Moreover, experiments indicate that the proposed method outperforms other methods known in the prior art.

The proposed method can be applied to solve any application/problem which requires the denial/refusal of some types of input data. General recognition applications, which are inherently open-set (for instance: biometric recognition, object recognition, scene recognition, speech recognition, character recognition, pattern recognition, etc.) could profit from the invention.

For example, the proposed method can be applied on biometric problems (which are open-set). The method would recognize a number n of people. Any person that is not among the n known persons must be recognized by the system as an unknown person, i.e., the person cannot be recognized as being one of the n persons and therefore must be rejected by the method. It is exemplified the use of the invention in a face recognition system in which there is interest in a small set of individuals. For example, considering the following application: the user has an image of a crowd and is interested in finding three specific individuals (e.g., three missing children). The user must have training images of the three individuals of interest, and then, the user will be able to train the proposed method to use it in the images of the crowd (test image). Then, with the support of a face localization algorithm, every face of the crowd image is classified by the proposed method as one of the three persons of interest or unknown (none of them). In the usual approach to handle the open-set scenario, the threshold is difficult to define and it is common to classify many unknown samples as one of the training ones. In other words, using this example of face recognition, a traditional method known in the prior art would classify many faces of the crowd image as belonging to the face of one of the three persons of interest (most similar).

The proposed method can also be applied on medical problems. Many medical problems reduce to the question of verifying whether or not someone is healthy based on observed data and experts opinions. Some diseases can be known a priori, but in some cases the classifier cannot be trained with all possible manifestations of a disease because the evident limitations on acquiring disease samples of all kinds of diseases. Furthermore, it is possible the arising of a new kind of some disease and, in all these cases, the classifier must evaluate if the person is healthy or not. One specific example of medical applications are the oncology problems. In real cases, usually only some samples of a limited number of cancer types are available, because it is very difficult to acquire data from all possible disease variations. The method of the present invention can be trained with the known cancer types and, during test phase (usage), if unknown samples (types of cancer) are submitted, the method should be able to classify them as unknown, instead of classifying them as one of the known ones; and if a known sample (type of cancer) is submitted, the method should also be able to classify as the correct known class. Another problem is the heart views classification, wherein the method must be able to classify the view of the machine's probe as one of the views to which a doctor is interested. However, some of the views may not make sense and are better to be classified as unknown, e.g., the views obtained in the transition of one position of the probe to another. Furthermore, new machines for ultrasound are able to get so much information for the doctor, e.g., by constructing a 3D model of the heart based on orthogonal views. However, in these machines the operator must specify which type of views is being used (e.g., apical four-chamber, two-chamber, parasternal long axis, and short axis views). Using a better method for classification of the views, the system of the machine possibly will be able to use the available information of the views to construct the 3D model automatically, without bothering the operator about the type of the view and, consequently, obtain more views to use in this 3D model construction.

The proposed method can be applied in action prediction at smart homes, in which the objective is to recognize the activities of the individuals of the home by means of different sensors. Some recent investigations about the action prediction at smart homes and for ubiquitous healthcare (u-healthcare) environments refer to the classification of users' actions as one of the known possible actions. However, abnormal actions are possible to happen (e.g., the fall of an elderly) and they differ so much among them. Then, a classifier able to recognize an unknown action is required in such applications. In this scenario, the existing closed-set classifiers will always classify an individual's action as one of the known one. Consequently, unexpected actions cannot be identified. The usual approach to handle open-set is also not so much reliable because the threshold on the similarity score is difficult to estimate and the classifier tends to classify the testing sample as one of the known ones. Consequently, abnormal actions can be unnoticed. The proposed method is to recognize the user action as one of the known ones when the individual really perform them or classify the action as unknown (i.e., and abnormal action).

The proposed method of the present invention also can be applied to the problem of remote sensing image classification to classify input images as containing one of the patterns of interest or unknown. For example, one could be interested in recognizing five types of vegetation (e.g., tropical forest, subtropical forest, savannah, Mangrove and swampland) and other types of vegetation must be classified as unknown by the system. The proposed method allows this type of classification. Identifying that many of the sub regions of a large region are unknown (not one of the five mentioned types of vegetation), the system can automatically infer that the region possibly does not belong to a specific country (e.g., Brazil). Using a closed set classifier or using the usual approach to handle the open-set scenario (based on threshold in the similarity scores) makes the systems to classify the input sample as one of the available known classes, leading to misclassification.

The proposed method can also be applied on security applications, in which the objective is to allow only non-attack processes. Normal behavior can be well known by the security system. On the other hand, attack behavior is rare, different to the normal ones, and potentially very different among them. New forms of attack, which have never seen before, can be created at any time by criminals and the security system (using the proposed method) must identify that they are not normal, i.e., it must classify the behavior of the processes as unknown and refuse it.

The proposed method can also be applied for non-desirable image classification (e.g.: violence or pornographic videos or images). Given that the method have categories of non-desirable scenes (images with blood, explosion, fight, nude bodies and so on), it should be able to correctly classify the test scenes (samples) as one of the known types of non-desirable scenes; and all other types of images that potentially appear should be classified as unknown.

The proposed method can also be applied on gestures and sign language recognition, in which only the existing signs and gestures must be recognized, and any other kind must be rejected.

The proposed method can also be applied on speech recognition, in which there are several types of commands that are known during the method training. However, during the method use (test phase), unknown voice commands may potentially appear. The proposed method should be able to correctly recognize the voice commands as well as be able to correctly reject unknown commands.

The proposed method can also be applied on the scene and object detection problem, where it should be detected/recognized only a limited set of objects, and anything else must be properly rejected, i.e., classified as unknown. Scene and object recognition is very important for many kinds of applications, like: landmark recognition, visual-based geocoding, information retrieval, etc. One could imagine applications embedded into mobile and wearable devices in which the objective is to automatically recognize the scenes and objects nearby the device. The detailed example hereinafter shows an application of scene recognition in a real world problem.

The aforementioned applications are not exhaustive and many others are possible, whenever there is a problem in which only a few classes are known (available, considered)

during training phase of a machine learning system. The proposed method of the present invention is able to efficiently deal with all those cases, oppositely to closed-set classifiers.

Detailed example of the proposed method usage in a real world problem

For a better understanding of its potentials, it is presented a detailed example of the proposed method usage in a real world problem; in this case, a scene recognition problem. The scene recognition scenario is a much opened scenario problem, since there are countless possible classes to recognize, varying from more general ones (e.g., coast, forest, mountain, highway, tall building, kitchen, office, store, etc.) to more specific ones, such as specific cities (e.g., Rio de Janeiro, Seoul, New York, London, etc.). Therefore, recognition systems frequently cannot be trained with all existing classes of scenes. Scenes that are unknown at training time but appear during the method use need to be classified as unknown instead of being wrongly classified as one of the existing/known classes.

Suppose a user is using the classification/recognition system in a smart glass aiming at obtaining information about the place where he/she is at (the scene). When the user goes to a certain place, for example, a famous store like Starbucks, the smart glass must be able to show to the user information about the company, review of customers, etc.

To this specific problem, there are some things that a simple logo matching cannot do and a machine learning method for the open-set scenario is paramount, as explained next. If the user goes to a non-famous place, store, or landmark, the system would not be able to recognize it is based only pattern matching-based because in a non-famous place there is no logo or other well-established pattern to be recognized. In such cases it is required to use a more general algorithm of machine learning. The proposed method deals with this problem because all places of the database have a general representation of each class and, when the input image of the place from the user's smart glass is processed, it is also presented in a general representation. Then the method of the present invention will be able to recognize which place, store, landmark, etc. the input is related to or recognize if the input is none of the places, stores, landmarks, etc. stored in the database and, thus, it is going to automatically warn the user that it is an unknown place (if that is the case).

As an example, suppose we have a set of trained representations for the city of Rio de Janeiro trained with three important city's points of interest (Cristo Redentor, Pão de Açúcar, and Maracaña Stadium). A tourist visiting Rio de Janeiro will receive more information about the three points of interest if he/she captures an image of it by using the smart glass or even a mobile. However, as the method was not trained for other points of interest, when the user points out to a point not previously seen, it must automatically disregard that scene by not connecting it to one of the known ones. For instance, if the user/tourist is in front of another building (e.g. Laranjeiras Stadium), the system must recognize it is not Maracanã and do not show the wrong information to the user/tourist.

Using the example of the city of Rio de Janeiro, the present invention works as follows. Based on the input image/sample X of the Laranjeiras Stadium acquired from the smart glass, for example, the method is going to acquire the class (Cristo Redentor, Pão de Açúcar, and Maracanã Stadium) most next/similar to X. Possibly the most similar class to X (Laranjeiras Stadium) is the Maracanã Stadium. The second class most similar to X is also acquired (in this case, suppose it is Pão de Açúcar). The similarity score $\delta_1$ between the representation of X (Laranjeiras Stadium) and the representation of the class Maracanã Stadium is obtained. The similarity score $\delta_2$ between the representation of X (Laranjeiras Stadium) and the representation of class Pão de Açúcar is obtained. Note that the smaller the similarity score is, more similar are the both representations used to obtain it, i.e., $\delta_1 < \delta_2$ since Maracanã Stadium is more similar to X (Laranjeiras Stadium) than Pão de Açúcar. The open-set method calculate R=$\delta 1/\delta 2$ and compares R to T, being T a threshold between 0 and 1 defined in the training phase of the method. If R<T, the method classifies X as Maracanã Stadium. If R≥T, the method classifies X as unknown. Then, possibly $\delta_1$ is large enough to make R tending to 1 (consequently, make R≥T) and X (Laranjeiras Stadium) would be classified as unknown scene by the classifier. Of course, the similarity score $\delta_1$ is dependent on the features extracted from both the sample/scene X and class Maracanã Stadium: if it is extracted a single feature, $\delta_1$ will be small because X (Laranjeiras Stadium) and Maracanã Stadium are both ancient buildings and have visual characteristics in common. However, using appropriate features (able to gather subtleties of the scene) the difference between X (Laranjeiras Stadium) and class Maracanã Stadium is going to be more evident (a greater value of $\delta_1$).

Going even further, the use of the method of the present invention allows the scene recognition system of the smart glass to update itself with new entries. For example, when the user asks to classify an input and the smart glass classifies it as unknown, the smart glass can send to the system/server the GPS information. When many users try to acquire information of the same global positioning and send places/GPS' information to the server, the system will be able to discover a new class and incorporate that class to the database. Of course, it is also possible to the users to send information about the scene/image, such as name of the place/building, phone, etc. Once the new entry is incorporated in the database, when a new user tries to acquire information of such a place, the place would be recognized (i.e., will no longer be considered unknown).

Although the present invention has been described in connection with certain preferred embodiments, it should be understood that it is not intended to limit the invention to those particular embodiments. Rather, it is intended to cover all alternatives, modifications and equivalents possible within the spirit and scope of the invention as defined by the appended claims.

What is claimed is:

1. A method for multi-class classification of open-set scenarios of at least one of image recognition and speech recognition, the method comprising:
   dividing, by at least one processor, a set of training samples stored in at least one memory, including at least one of an image sample and an audio sample, into classes of interest;
   training, by the at least one processor, a multiclass classifier using the training samples divided into classes of interest, to obtain intrinsic parameters of the training samples;
   acquiring, by the at least one processor, a rejection parameter through parameter optimization of the obtained intrinsic parameters;
   receiving, by the at least one processor, a test sample including at least one of an image sample and an audio sample;

determining, by the at least one processor, two classes of the classes of interest that are similar to the test sample as a first class and a second class;

determining, by the at least one processor, a first similarity score between the first class and the test sample, and a second similarity score between the second class and the test sample;

determining, by the at least one processor, a ratio as the first similarity score divided by the second similarity score;

classifying, by the at least one processor, the test sample as:
  a known sample if the determined ratio is less than the acquired rejection parameter, and
  an unknown sample if the determined ratio is greater than or equal to the acquired rejection parameter;

providing, by the at least one processor, information related to the classified test sample based on the classification of the test sample, wherein the information includes one of an identification of the known sample and a request for a user to provide an identification of the unknown sample; and applying, by the at least one processor, the provided information including at least one of the identification of the known sample and the identification of the unknown sample to the multiclass classifier for the classification of open-set scenarios to recognize the at least one of the image sample and the audio sample.

2. The method according to claim 1, wherein the dividing the set of training samples comprises dividing the set of training samples into a fitting set and a validation set.

3. The method according to claim 2, wherein the parameter optimization comprises uses the set of training samples included in the fitting set to simulate an open-set scenario, and executes a traditional grid search procedure to optimize the rejection parameter using the set of training samples included in the validation set.

4. The method according to claim 1, wherein the determining the first class and the second class comprises finding two classes of the classes of interest that are most similar to the test sample.

5. The method according to claim 1, wherein the rejection parameter is greater than or equal to zero and less than or equal to one.

6. The method according to claim 1, further comprising identifying information of an unknown sample.

7. The method according to claim 5, wherein the rejection parameter defines a bounded region in a characteristics space in which the test sample is classified as one of the known sample and an unlimited region in which the test sample is classified as the unknown sample.

8. The method according to claim 1, wherein the first similarity score and the second similarity score include at least one of a cost function of Optimum-Path Forest classification and a distance metric of k-Nearest Neighbors classification.

9. The method according to claim 1, wherein the test sample includes at least one of biometric information, facial information, object information, scene information, voice information, character information, sensor information, image information, video information, text information, speech information, audio information, and pattern information.

10. The method according to claim 1, wherein the test sample includes at least one of medical information.

11. A non-transitory computer-readable recording medium storing a program to implement a method for multi-class classification of open-set scenarios of at least one of image recognition and speech recognition, the method comprising:

dividing, by at least one processor, a set of training samples stored in at least one memory, including at least one of an image sample and an audio sample, into classes of interest;

training, by the at least one processor, a multiclass classifier using the training samples divided into classes of interest, to obtain intrinsic parameters of the training samples;

acquiring, by the at least one processor, a rejection parameter through parameter optimization of the obtained intrinsic parameters;

receiving, by the at least one processor, a test sample including at least one of an image sample and an audio sample;

determining, by the at least one processor, two classes of the classes of interest that are similar to the test sample as a first class and a second class;

determining, by the at least one processor, a first similarity score between the first class and the test sample, and a second similarity score between the second class and the test sample;

determining, by the at least one processor, a ratio as the first similarity score divided by the second similarity score;

classifying, by the at least one processor, the test sample as:
  a known sample if the determined ratio is less than the acquired rejection parameter, and
  an unknown sample if the determined ratio is greater than or equal to the acquired rejection parameter;

providing, by the at least one processor, information related to the classified test sample based on the classification of the test sample, wherein the information includes one of an identification of the known sample and a request for a user to provide an identification of the unknown sample; and applying, by the at least one processor, the provided information including at least one of the identification of the known sample and the identification of the unknown sample to the multiclass classifier for the classification of open-set scenarios to recognize the at least one of the image sample and the audio sample.

12. An apparatus comprising:
at least one memory configured to store instructions; and
at least one processor configured to execute the stored instructions to implement a method for multi-class classification of open-set scenarios of at least one of image recognition and speech recognition, the method comprising:

dividing, by the at least one processor, a set of training samples stored in the at least one memory, including at least one of an image sample and an audio sample, into classes of interest;

training, by the at least one processor, a multiclass classifier using the training samples divided into classes of interest, to obtain intrinsic parameters of the training samples;

acquiring, by the at least one processor, a rejection parameter through parameter optimization of the obtained intrinsic parameters;

receiving, by the at least one processor, a test sample including at least one of an image sample and an audio sample;

determining, by the at least one processor, two classes of the classes of interest that are similar to the test sample as a first class and a second class;

determining, by the at least one processor, a first similarity score between the first class and the test sample, and a second similarity score between the second class and the test sample;

determining, by the at least one processor, a ratio as the first similarity score divided by the second similarity score;

classifying, by the at least one processor, the test sample as:
 a known sample if the determined ratio is less than the acquired rejection parameter, and
 an unknown sample if the determined ratio is greater than or equal to the acquired rejection parameter;

providing, by the at least one processor, information related to the classified test sample based on the classification of the test sample, wherein the information includes one of an identification of the known sample and a request for a user to provide an identification of the unknown sample; and applying, by the at least one processor, the provided information including at least one of the identification of the known sample and the identification of the unknown sample to the multiclass classifier for the classification of open-set scenarios to recognize the at least one of the image sample and the audio sample.

* * * * *